July 11, 1939.　　L. J. NOWAK, JR　　2,165,501
DASH POT
Filed Jan. 12, 1938
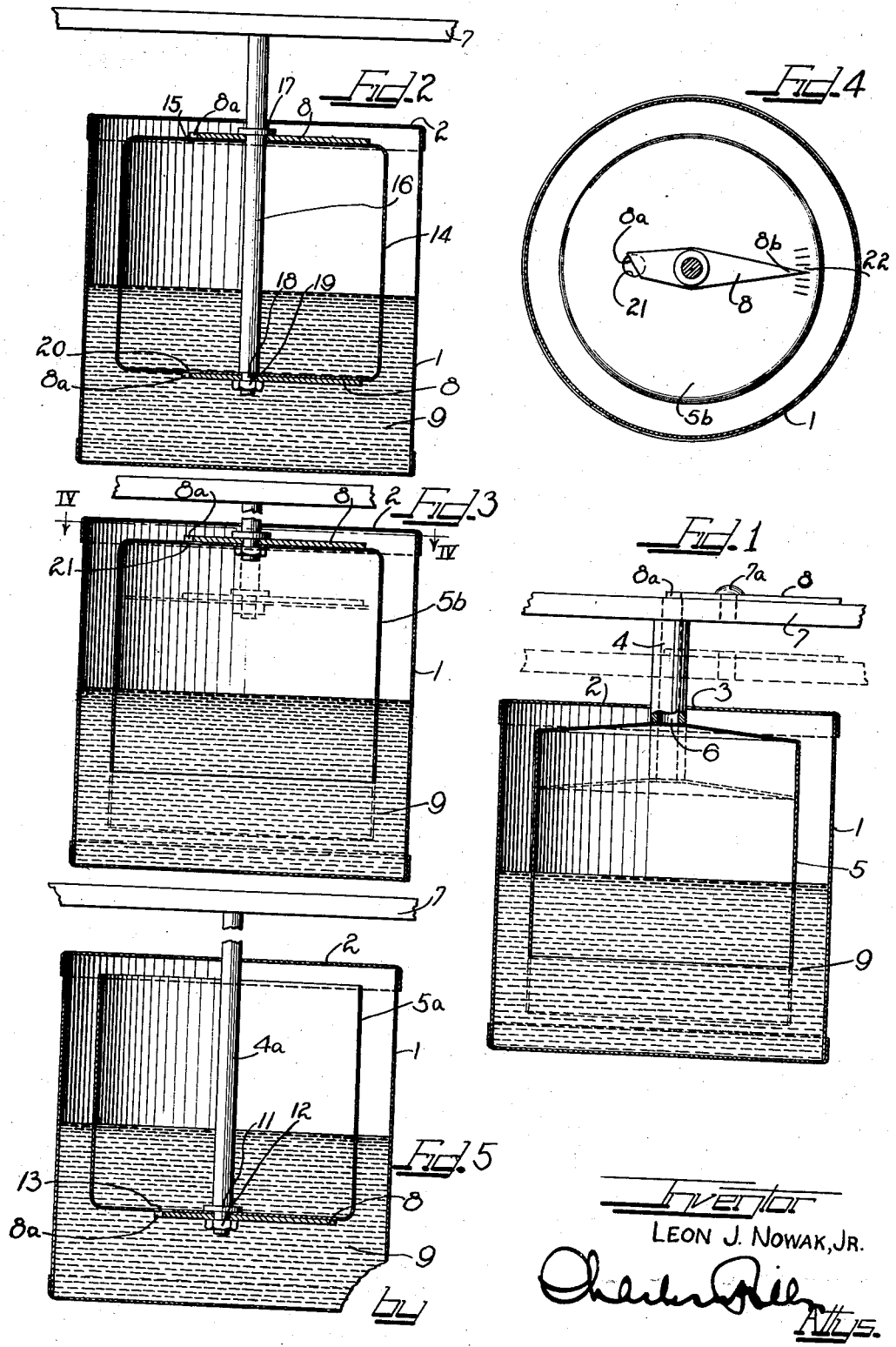
Inventor
LEON J. NOWAK, JR.

Patented July 11, 1939

2,165,501

UNITED STATES PATENT OFFICE 2,165,501

DASH POT

Leon J. Nowak, Jr., Chicago, Ill.

Application January 12, 1938, Serial No. 184,620

6 Claims. (Cl. 188—96)

This invention relates to a dash pot primarily designed for snubbing scale beams or other elements that require only a light snubbing action, but that is adapted for many other uses.

In the weighing of material, the scale beam frequently oscillates up and down or flutters and requires a certain amount of time to come to rest. This results in much loss of time and greatly decreases the rate at which material can be weighed.

To overcome the above noted objection, it has been proposed to dampen the movement of scale beams by the use of dash pots. But the dash pots heretofore used caused inaccurate weighings. In other words, these dash pots caused too large a variation from the desired weight and for this reason they proved unsatisfactory.

These prior art dash pots contained a number of defects for the purpose sought to be accomplished. As a general rule, the plunger fits the cylinder wall quite closely and creates friction that causes inaccurate weighing, in operation. Further, in some instances the stem of the plunger passes through a close fitting aperture that creates friction. Such friction would be objectionable and cause inaccurate weighing.

Further, in the use of such dash pots, it is essential to use a liquid or a liquid fluid that does not evaporate or freeze. As glycerine possesses these characteristics it has been generally used in connection with such dash pots.

Glycerine and such liquids have heretofore been used in dash pots. However, such liquids would adhere to the surface of the plunger when it is elevated above the fluid and cause inaccurate weights.

It is an object of this invention to overcome the above noted defects in the prior dash pots by the elimination of all friction in the operation of a dash pot and in the use of a suitable liquid that is substantially non-adhesive with respect to the plunger as it moves above the liquid.

In order to eliminate friction, the retardation or snubbing action has been made more or less dependent upon the rate of flow of air or a liquid fluid through an orifice in the plunger whereby the plunger may be supported and operated without frictionally engaging any parts of the vessel in which it operates.

After much experimentation, I discovered a liquid for the dash pot that has the properties of glycerine in that it does not freeze or evaporate, and that is substantially non-adhesive with respect to the plunger. In actual practice, it has been found that a dash pot embodying this invention, in use with a scale, produces very accurate results, far superior to any apparatus now in use. The variations from actual weight attained through this invention hardly ever exceed 1/64 of an ounce, a negligible quantity.

With these and other objects in view, which will become apparent as the description proceeds, this invention comprises the novel structure and combination of parts hereinafter described and more particularly pointed out and defined in the appended claims.

In the accompanying drawing which illustrates certain preferred forms of this invention and in which similar reference numerals refer to similar features in the different views, Figure 1 is a sectional view of a dash pot involving this invention.

Figure 2 is a sectional view through a modified form of dash pot involving this invention.

Figure 3 is a sectional view through a further modified form of dash pot involving this invention.

Figure 4 is a sectional view taken upon the line IV—IV of Figure 3 looking in the direction of the arrows.

Figure 5 is a sectional view through a further modified form of dash pot.

In referring to the drawing, it will be observed that each of the different forms of dash pots illustrated consists of a container or vessel 1 adapted for containing a fluid into which the plunger or bell dips.

It is highly desirable that such fluid should not evaporate or freeze. Further, such fluid should be a freely flowing fluid that does not wet the plunger to any material degree, and that puts very little drag upon the plunger. I have discovered that ethylene-glycol, or a product known as "Prestone" possesses the above characteristics and produces better results than any other fluid, in that it is substantially non-adhesive with respect to the plunger.

Referring now to Figure 1, it will be observed that the cover 2 of the dash pot is provided with an aperture 3 for freely receiving the stem 4 of a plunger 5 which is shown as an inverted cup or bell formed of sheet metal. The stem 4 is provided with an air fluid relief passage 6 that establishes communication between the interior of the plunger and the atmosphere. The upper end of the stem 4 is shown as attached to a movable member 7 such as a scale beam, the movements of which it is desired to dampen. The air passage in the stem 4 is continued through the member 7 and upon the member 7 there is pivoted intermediate its ends as indicated at 7a, a narrow flat plate 8 that serves as a valve for regulating the air passage 6.

The valve 8 is similar to the one shown in Figure 4 in that it has a sloping end 8a adjacent the air passage 6 so that the flow of air can be varied.

When the scale beam 7 is in its unbalanced position, the plunger 5 will be in its lowered position in the fluid 9 as shown in dotted lines in Figure 1. In this position, there will be a certain amount of air trapped within the plunger, that is in communication with the atmosphere through the air passage 6. As the plunger is lowered, liquid will rise in the plunger and cause air to escape through the passage 6 to the atmosphere. As the flow of this air is restricted, the downward movement of the plunger is retarded and a snubbing action will result. Now, when the scale beam moves to balanced position, the plunger will be elevated. This upward movement of the plunger will tend to produce a vacuum within the cup 5 with the result that air will flow inwardly through passage 6. This inward flow of air is restricted and will cause a lifting of the fluid within the plunger and thereby create a snubbing action. Thus the snubbing action depends upon the rate of flow of air through passage 6. The size of the passage 6 can be varied to increase or decrease the snubbing effect.

In Figure 5, the plunger 5a is reversed so that the top becomes the bottom. A stem 4a is suitably anchored to the bottom between a collar 11 on the stem within the plunger and a nut 12 on the end of the stem below the cup. The bottom of the plunger is formed with an aperture or fluid port 13 through which fluid can pass. The size of this port can be adjusted by means of a flat, narrow plate 8 similar to the valve above described and which is pivoted upon the rod 4a between the bottom of the plunger and the nut 12. The left hand end of this plate which serves as a valve, slopes as indicated at 8a in the region of the port 13, so that the port can be more or less closed in a manner similar to the showing in Figure 4.

In the operation of this dash pot it will be evident that as the plunger is lowered it will displace the fluid therebeneath and cause the fluid to enter the port 13 and produce a snubbing action which can be varied through adjustment of the valve 8.

When the plunger 5a is caused to rise by the action of element 7, its upward movement will be retarded by the weight of the fluid in the cup, which fluid will gradually drain therefrom through port 13 as the cup is raised. Thus, the retarding effect is gradually lessened as the cup is elevated and depends upon the rate of flow of fluid through port 13.

In Figure 2, there is shown a dash pot embodying the principles disclosed in Figures 1 and 5, or, in other words, it is a combination of the two. In this figure, there is shown a plunger 14 closed at its top and bottom. An air port 15 is formed in the top and the size of this air port 15 can be varied by a valve 8 pivoted to the stem 16 between a collar 17 thereon and the top of the plunger.

The stem 16 extends through the top of the plunger and through the bottom thereof. The lower end of the stem 16 is reduced as indicated at 18 to form an annular shoulder that rests against the bottom of the plunger. A nut 19 is secured upon the end of the stem to anchor the same to the plunger. Between the nut 19 and the bottom of the plunger, a valve 8 is pivoted upon the rod 16 for regulating a port 20 in the bottom of the plunger in a manner similar to the construction shown in Figure 5. The nut 19 and collar 17 cooperate to frictionally maintain both of the valves 8a in adjusted positions relative to their associated ports.

When the plunger 14 descends, it will displace a certain amount of fluid in the container and cause the same to enter port 20 and cause air to escape through port 15. Thus there will be a retarding action as the plunger descends.

When the plunger 14 is caused to rise by the action of element 7, it will be retarded and impart a snubbing action to the element 7, for as the plunger rises, it will be retarded by the fluid therein and this retardation will decrease as the fluid flows out through the port 20. Further, as the plunger 14 rises, air will enter the port 15 to take the place of the displaced liquid and the rate of flow of the air will likewise result in creating a snubbing action.

In Figure 3, there is shown an inverted plunger 5b similar to the one shown in Figure 1. The plunger 5b, however, has an air port 21 in its top that can be regulated by a valve 8 as shown in Figure 4. The valve 8 as illustrated in Figure 4 has a sloping end 8a for varying the size of the port 21, while the other end is pointed as indicated at 8b for moving over a calibration 22 on the plunger.

The operation of the dash pot shown in Figure 3, is similar to the one shown in Figure 1. A cushion of air is created under the plunger 5b that is compressed when the plunger descends. The pressure of the air during this compression is relieved through the escape of air through port 21 that communicates with the atmosphere. Thus a light snubbing action is present upon the downward stroke of the plunger.

When the plunger 5b is caused to be elevated by the element 7, it will impart a light snubbing action thereto, for as the plunger rises, it will tend to create a vacuum in the plunger and this vacuum will draw air through the port 21 as in the first form.

It is characteristic of this invention that the plunger in all instances is much smaller in diameter than the diameter of the containers and does not contact the walls thereof or cooperate with the wall in any manner, nor does the stem of the plunger which passes through an enlarged aperture in the cover create any friction.

In the different forms illustrated there is a retarding effect produced upon the movable element 7 that is connected to the stem of the plunger, and this retarding effect is due primarily to the flow of air or a mobile fluid through an orifice which can readily be varied to decrease or increase the retardation. It will be appreciated that the retarding effect produced by this invention is especially adapted for dampening the movement of scale beams and similar devices. It will further be appreciated that the dash pot involving the invention is very simple and can be economically manufactured and assembled.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A dash pot comprising a container for a fluid, and a hollow plunger within said container and dipping into said fluid, said plunger having a top wall with a vent for the admission of air within said plunger when said plunger moves in one direction, and the escape of air when the plunger moves in the other direction.

2. A dash pot comprising a container for a liquid, an inverted cup having its open end dipping into said liquid, said liquid being free to enter and leave the open end of the cup unimpeded and the liquid in the cup defining a piston, and a vent in said cup disposed above the surface of the liquid for controlling the admission and escape of air from the cup during relative movements of the cup and said liquid piston.

3. A dash pot comprising a container for a liquid, a hollow plunger partially immersed in said liquid and having its wall spaced from the wall of said container, said plunger having a vent disposed above the level of said liquid for controlling the admission and escape of air relative to the interior of the plunger, when the plunger is lowered and raised in said liquid.

4. A dash pot comprising a hollow member closed at one end, said end being disposed in a compressible fluid, a passageway establishing communication between the interior of said member and said fluid, a substantially non-compressible fluid defining a piston in said member, said piston and said member being relatively movable, and means for controlling the escape and admission of said compressible fluid through said passageway during said relative movement.

5. A dash pot comprising a pair of nested containers supported for relative axial movements, and having their walls in spaced relation, a liquid partially filling said containers, the inner container having a bottom containing a passageway for flow of liquid between the containers, and means for adjustably controlling the flow of liquid through said passageway when the level of liquid in one of the containers is displaced relative to the level of the liquid in the other container by said relative movement.

6. A dash pot comprising an outer container, an inner hollow closed container, said containers having their walls in spaced relation and supported for relative axial movement, a liquid medium partially filling said containers, a gaseous medium in the portions of said containers not occupied by said liquid, a passageway for the flow of the gaseous medium between the containers, a passageway for the flow of the liquid between the containers, and valve means for independently adjusting the flow through said passageways resulting from the relative movement of the containers.

LEON J. NOWAK, JR.